Sept. 6, 1927.
M. B. MORGAN
1,641,190
DIFFERENTIAL MECHANISM
Filed April 2, 1927
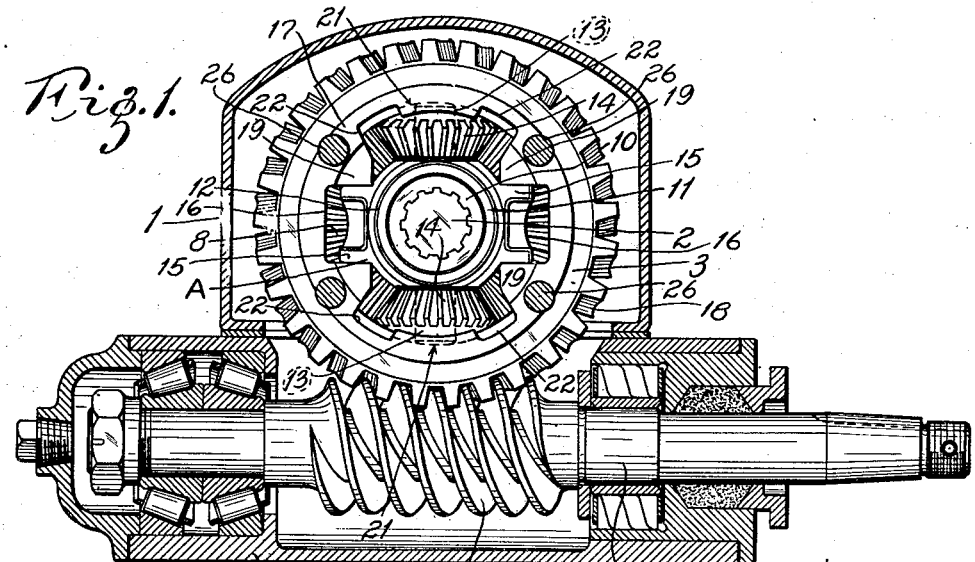
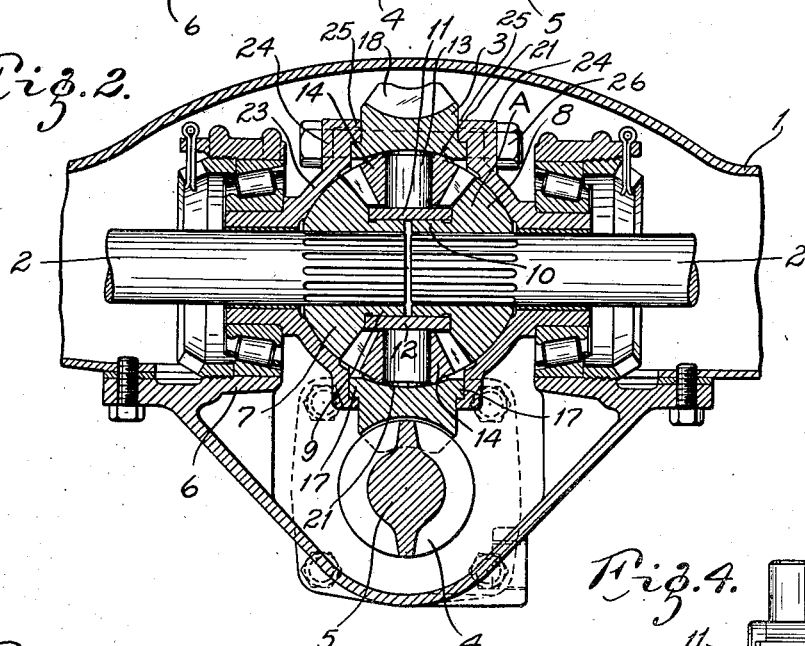
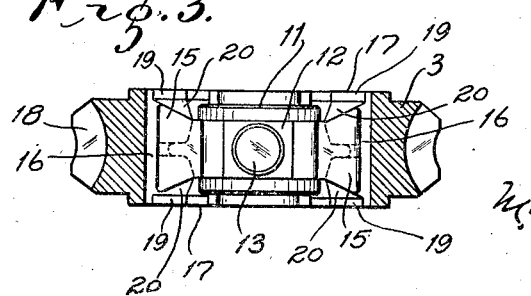
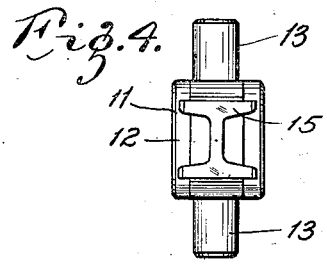
INVENTOR:
Matthew B. Morgan
by HIS ATTORNEYS.

Patented Sept. 6, 1927.

1,641,190

UNITED STATES PATENT OFFICE.

MATHEW B. MORGAN, OF DETROIT, MICHIGAN, ASSIGNOR TO THE TIMKEN-DETROIT AXLE COMPANY, OF DETROIT, MICHIGAN, A CORPORATION OF MICHIGAN.

DIFFERENTIAL MECHANISM.

Application filed April 2, 1927. Serial No. 180,448.

My invention relates to differential mechanism. It is common practice at the present time to interpose a differential mechanism between the two driving shaft sections of the axle; and with heavy trucks and certain other types of automobiles, the propeller shaft is a worm that meshes with a worm gear on the differential mechanism. But for lighter and smaller vehicles, it has heretofore been the common practice to transmit the power from a bevel pinion on the propeller shaft to a bevel ring gear on the differential mechanism, this common practice being mainly due to the fact that the differential mechanisms heretofore commonly used would reduce the ground clearance of an underhung worm propeller construction below permissible limits. Accordingly the principal object of the present invention is to make it feasible to use an underhung worm propeller for small and light vehicles; to produce a differential mechanism of great compactness; to simplify and cheapen the construction and operation of assembling and disassembling the differential mechanism; and to obtain other advantages hereinafter appearing. The invention consists in the construction, combinations and arrangements of parts hereinafter described and claimed.

In the accompanying drawings wherein like numerals refer to like parts wherever they occur, Fig. 1 is a vertical central sectional view of driving axle construction embodying my invention, Fig. 2 is a vertical longitudinal section of the construction illustrated in Fig. 1, Fig. 3 is a detail view of the spider mounted in the gear ring, said ring being shown in section; and Fig. 4 is a detail view of the spider at right angles to the position shown in Fig. 3.

The construction indicated in the present drawing comprises a tubular axle casing or housing 1 having driving shaft sections 2, 2 therein, with a differential mechanism A mounted on the inner ends of said shaft sections. Mounted on the differential mechanism and forming part thereof is a gear ring 3 which meshes with a gear or worm 4 on the propeller shaft 5. In the construction illustrated, the differential mechanism and the propeller shaft are mounted on a differential carrier 6 of common type and are removable therewith as a unit. In the construction shown, the gear ring 3 is a worm gear and the propeller shaft has a worm and is underhung or located below said worm gear.

The differential mechanism comprises two opposed bevel gears 7, 8 hereinafter called driven gears, which are splined or otherwise secured on the inner ends of the respective shaft sections to rotate therewith. These gears have annular hubs 9, 10 extending towards each other and constituting a cylindrical support for the cylindrical hub 11 of a spider 12. This spider has two radially disposed cylindrical arms 13 integral therewith and extending therefrom on diametrically opposite sides and constituting stub shafts or journals on which are rotatably mounted bevel pinions 14, hereinafter called driving pinions, that intermesh with said first mentioned bevel gears 7, 8, respectively. Said spider also has two arms 15 integral therewith and extending radially on opposite sides, these arms being squared or shaped on opposite sides to fit into or interlock with longitudinal grooves or recesses 16 provided therefor in the gear ring 3.

In the construction shown, the gear ring is a ring of compact cross section with its inner margin widened out on opposite sides to form lateral annular flanges 17, and with its outer periphery cut or otherwise made into a worm gear 18. For the sake of compactness and in order not to reduce the strength of the gear ring, the longitudinal grooves or recesses 16 that receive the squared arms 15 of the spider are formed by pairs of spaced longitudinal ribs or lugs 19 that extend inwardly from the inner surface of such ring. The faces of the ribs 19 of each pair are spaced apart and shaped to form between them the longitudinal groove or recess 16 into which the locking arms 15 of the spider can be inserted either by sliding the said spider bodily, (in case the stub shafts do not interfere) or by swinging said spider on the stub shafts as an axis as hereinafter described. The locking arms fit in the recesses and are thereby interlocked with the gear ring in such manner as to form a driving connection therewith; whereas the stub shafts of the spider preferably have no driving engagement with such gear ring.

As indicated at 21, the inner surface of the gear ring is provided with bosses at diametrically opposite points and the inner faces of these bosses have a substantially spherical curvature whose center is at the axis of the gear ring, thus forming recesses or grooves to receive the outer ends of the hub portions of the bevel pinions. Such hub portions are preferably made of substantially the same curvature as such recesses or a curvature of shorter radius; and the parts are so proportioned that when the inner ends of the hubs of the bevel pinions fit against the hub of the spider, the outer ends of such hubs will fit against the spherical recesses in the gear ring and thereby interlock said spider against bodily movement transversely of the plane of the gear ring and still leave said spider free to rotate in any direction around the center of the spherical surfaces of said recesses. The spider may be mounted in the gear ring in the following way: The spider is inserted half-way through the gear ring with the axis of the stub shafts coinciding or close to the axis of said gear ring and with the locking arms adjacent to the recessed bosses. In this position, the axis of the spider and the axis of the gear ring intersect at the center of curvature of the recessed bosses; and the spider is then turned on such center of curvature until the pinions on the stub shafts become seated in their spherical seats in said bosses. In this position, the locking arms of the spider and the grooves provided therefor in the gear ring lie in the same plane; and the spider is rotated on the axis of the stub shafts until the locking arms enter said grooves. In this position, the axis of the spider coincides with the axis of the gear ring. By the arrangement described, the interlocking of the locking arms of the spider with the grooves provided therefor in the gear ring constitutes a very strong and simple driving connection, and it is noted that no special fastening devices of any kind are required to hold the parts in position.

The spider together with the driving pinions and driven gears of the differential are enclosed in a housing 23 that consists of two members of generally hemispherical shape that fit over the outer spherical surface of the driven gears. The larger ends of said members have outwardly projecting flanges 24 whose outer margins have laterally extending annular ribs 25 of proper size to fit over the lateral annular ribs 17 of the gear ring. The housing members are secured together by bolts 26 that extend therethrough and also through openings that pass through the lugs 19 on the inside of said gear ring. By this arrangement, the parts of the differential mechanism, including the gear ring, are firmly secured together without materially decreasing the strength of the gear ring and without increasing the diameter thereof above that required for efficient operation.

The construction hereinbefore described is strong, simple, compact and easy to manufacture and assemble; and by reason of its efficient utilization of the space inside of the gear ring, the overall diameter of the gear ring may be made small enough to permit the mounting of the worm propeller shaft underneath said gear and still leave ample ground clearance. Therefore, the invention makes it feasible to obtain for light and small vehicles the advantages arising from the use of a worm propeller shaft and particularly of an underhung worm shaft.

Obviously, the invention is not limited to a worm drive mechanism, as several of its advantages are equally applicable to a bevel gear or spur gear drive. Likewise, the construction may be changed in detail. Accordingly, I do not wish to be restricted to the details shown.

What I claim is:

1. In a differential mechanism, a driving gear ring having spaced lugs on its inner surface forming longitudinal grooves, a spider having radial arms and radial stub shafts that are free to move relatively to said ring in the plane thereof, bevel pinions mounted on said stub shafts and driven gears engaging said pinions said radial arms fitting in said grooves and constituting the sole driving connection between said gear ring and said spider, and said stub shafts constituting the sole journals for said pinions.

2. In a differential mechanism a driving gear ring having spaced lugs on its inner surface forming longitudinal grooves and also having in its inner surface recesses, a spider having arms that interlock with said longitudinal grooves and having also radial stub shafts, beveled pinions journaled on said stub shafts and having convex portions extending into said recesses, and driven gears engaging said pinions.

3. Differential mechanism comprising a toothed gear ring, a spider directly mechanically interlocked therewith, pinions rotatably mounted on said spider, driven gears intermeshing with said pinions, and a housing, said gear ring having its inner margin widened on both sides to form annular flanges and said housing comprising sections of hemispherical shape with peripheral flanges interlocking with the flanges of said gear ring and secured together by bolts that barely clear said driven gears.

4. Differential mechanism comprising alined shaft sections, oppositely disposed beveled gears secured to said shaft sections and having oppositely disposed hub portions, a spider comprising a hub portion mounted on the hub portions of said beveled gears, diametrically opposite arms constituting journals for beveled pinions and diametrically opposite arms squared to fit grooves in a worm gear, said beveled pinions having convex outer ends, a worm gear of compact cross-sectional shape which has spherical recesses in its inner surface adapted to receive the outer ends of said pinions and thereby lock the spider against transverse bodily movement and which has inwardly extending spaced lugs arranged to form grooves for said arms, and a housing comprising hemispherical sections with hub portions surrounding said shaft sections and with their outer peripheries engaging the sides of said gear ring and secured together by bolts that pass through said gear ring.

5. Differential mechanism comprising a worm gear ring having longitudinal grooves in its inner surface, a spider directly mechanically interlocked therewith, pinions rotatably mounted on said spider with their outer surfaces substantially flush with the inner surface of said ring, driven gears intermeshing with said pinions, and a housing, said gear ring having its inner margin widened on both sides to form annular flanges, and said housing comprising sections of hemispherical shape with peripheral flanges interlocking with the flanges of said gear ring and secured together by bolts that extend through said grooves and barely clear said driven gears.

6. Differential mechanism comprising a worm gear ring of compact cross-section with its inner margins extended laterally and with inwardly extending ribs on its inner surface arranged to form grooves for the locking arms of a spider and lock the same against relative movement in the plane of the ring, the spider having arms fitting in said recesses and having also laterally disposed arms constituting journals that are free to move relative to said gear ring in the plane of said ring but are locked against movement crosswise of said plane, pinions mounted on said journals, oppositely disposed gears intermeshing with said pinions and a housing comprising hemispherical sections with marginal portions overlapping the marginal portions of said gear ring bolted together by bolts that extend through the inner margin of said gear ring.

7. Differential mechanism comprising a worm gear ring of compact cross-section with its inner margins extended laterally and with inwardly extending ribs on its inner surface arranged to form locking grooves for the arms of a spider and lock the same against relative movement in the plane of the ring, and with bosses with spherical recesses on said inner surface adapted to receive the outer ends of driving pinions, the spider having arms fitting in said grooves and having also oppositely disposed arms constituting journals whose ends are interlocked with said gear ring in such manner that said ring can rotate on the axis of said arms and move relative to said ring in the plane thereof but is restrained from bodily movement crosswise of said plane, pinions mounted on said journals, oppositely disposed gears intermeshing with said pinions, and a housing comprising hemispherical sections with marginal portions overlapping the marginal portions of said gear ring bolted together by bolts that extend through the inner margin of said gear ring, the outer ends of said pinions being convex to enter the recesses of said bosses and thereby lock the spider against transverse bodily movement.

8. Differential mechanism comprising alined shaft sections, oppositely disposed beveled gears secured to said shaft sections and having oppositely extending hub portions, a spider comprising a hub portion mounted on the hub portions of said beveled gears, diametrically opposite arms constituting journals for bevel pinions and diametrically opposite arms squared to fit recesses in a worm gear, a worm gear of compact cross-sectional shape whose inner surface is substantially flush with the outer surfaces of said pinions and which has spaced lugs arranged to form locking grooves for said arms, and a housing comprising hemispherical sections with hub portions surrounding said shaft sections and with their outer peripheries engaging the sides of said gear ring and secured together by bolts that pass through the lugs inside of said gear ring.

9. In a differential mechanism, a driving gear ring having spaced lugs on its inner surface forming longitudinal grooves, a spider having radial arms and radial stub shafts, bevel pinions mounted on said stub shafts only, and driven gears engaging said pinions, said radial arms fitting in said grooves to form a driving engagement between said gear ring and said spider and being separable from said gear ring by rotation of the spider on the axis of said stub shafts, said stub shafts having interlocking engagement with said gear ring that prevents bodily displacement of the spider longitudinally of the axis of said ring but permits relative movement of the spider in the plane of said ring.

Signed at Detroit, Michigan, this 28th day of March, 1927.

MATHEW B. MORGAN.

CERTIFICATE OF CORRECTION.

Patent No. 1,641,190.   Granted September 6, 1927, to

MATHEW B. MORGAN.

It is hereby certified that error appears in the printed specification of the above numbered patent requiring correction as follows: Page 2, lines 93 and 94, claim 1, strike out the words "that are free to move relatively to said ring in the plane thereof"; and that the said Letters Patent should be read with this correction therein that the same may conform to the record of the case in the Patent Office.

Signed and sealed this 4th day of October, A. D. 1927.

Seal.

M. J. Moore,
Acting Commissioner of Patents.